United States Patent [19]

Gusman et al.

[11] Patent Number: 5,122,505
[45] Date of Patent: Jun. 16, 1992

[54] CARBONATE-FREE INORGANIC NITRATES OR OXIDES AND PROCESS THEREOF

[75] Inventors: Michael Gusman, Palo Alto; Gilbert Tong, Union City; Angel Sanjurjo, San Jose; Sylvia M. Johnson, Piedmont; Robert Lamoreaux, San Jose, all of Calif.

[73] Assignee: SRI International, Menlo Park, Calif.

[21] Appl. No.: 591,036

[22] Filed: Oct. 1, 1990

[51] Int. Cl.$^5$ .................................. H01L 39/12
[52] U.S. Cl. ......................... 505/1; 505/725; 505/734; 505/737; 505/780; 252/521; 423/593; 501/123
[58] Field of Search ............... 505/1, 725, 734, 737, 505/780; 252/521; 423/593; 501/123

[56] References Cited

U.S. PATENT DOCUMENTS 4,975,415  12/1990  Gusman et al. ................. 505/1
4,994,436   2/1991  Giacobbe ........................ 505/780

FOREIGN PATENT DOCUMENTS

WO90/06598  6/1990  World Int. Prop. O.

OTHER PUBLICATIONS

Leary et al., "The Use of Nitrogen Dioxide to Improve the Superconductive Properties of YBa$_2$Cu$_3$O$_7$," *JACS*, 73(4). pp. 904–908 (1990).
P. Barboux et al., "The Preparation of Bulk and Thick Films of YBa$_2$Cu$_3$O$_{1-7}$ Using a Solution Technique", Materials Research Society Fall Meeting, Boston, 1987.
P. H. Dickinson, et al., "Chemical vapor disposition of YBa$_2$Cu$_3$O$_{1-7}$ superconducting films," J. Appl. Phys. 66(1) 1 Jul. 1989.
A. M. Kini et al., High-T$_c$ Superconductors: Selective Preparation and Characterization of Tetragonal and Orthorhombic (93 K Superconductor) Phases of YBa$_2$Cu$_3$O$_{1-7}$, Inorgan. Chem. 1987 26, 1834–1836.
T. T. Kodas et al., "Aerosol flow reactor production of fine Y$_1$Ba$_2$Cu$_3$O$_7$powder: Fabrication of Superconducting ceramics," Appl. Phys. Lett, 52(19), p. 1622, 9 May 1988.
M. K. Wu et al., "Superconductivity of 93 K in a New Mixed-Phase Y—Ba—Cu—O Compound System at Amb. Pressure" Physical Review Lettrers, vol. 58, No. 9.

*Primary Examiner*—Paul Lieberman
*Assistant Examiner*—Bradley A. Swope
*Attorney, Agent, or Firm*—Phillips, Moore, Lempio & Finley

[57] ABSTRACT

The present invention relates to an improved process to produce an essentially carbon-free nitrate of an alkali metal, alkaline earth metal, transition metal, lanthanide metal, actinide metal, metal, or mixtures thereof, which process comprises:

Contacting an anhydrous composition of an alkali metal, alkaline earth metal, transition metal, lanthanide metal, actinide metal, or mixtures thereof substituted with an organic or an inorganic carbon-containing substitute with flowing nitrogen dioxide, dinitrogen tetroxide or mixtures thereof at a temperature of between about 40° to 150° C. under anhydrous conditions for a time and at a pressure effective to form the nitrate of the alkaline metal, alkaline earth metal, transition metal, lanthanide metal, actinide metal, or mixtures thereof, essentially free of any carbon containing contaminant. Materials produced by this improved process are useful as electrical superconductors, e.g. YBa$_2$Cu$_3$O$_7$, or as high performance advanced materials, e.g. BaTiO$_3$ or bariumaluminosilicate.

18 Claims, 14 Drawing Sheets

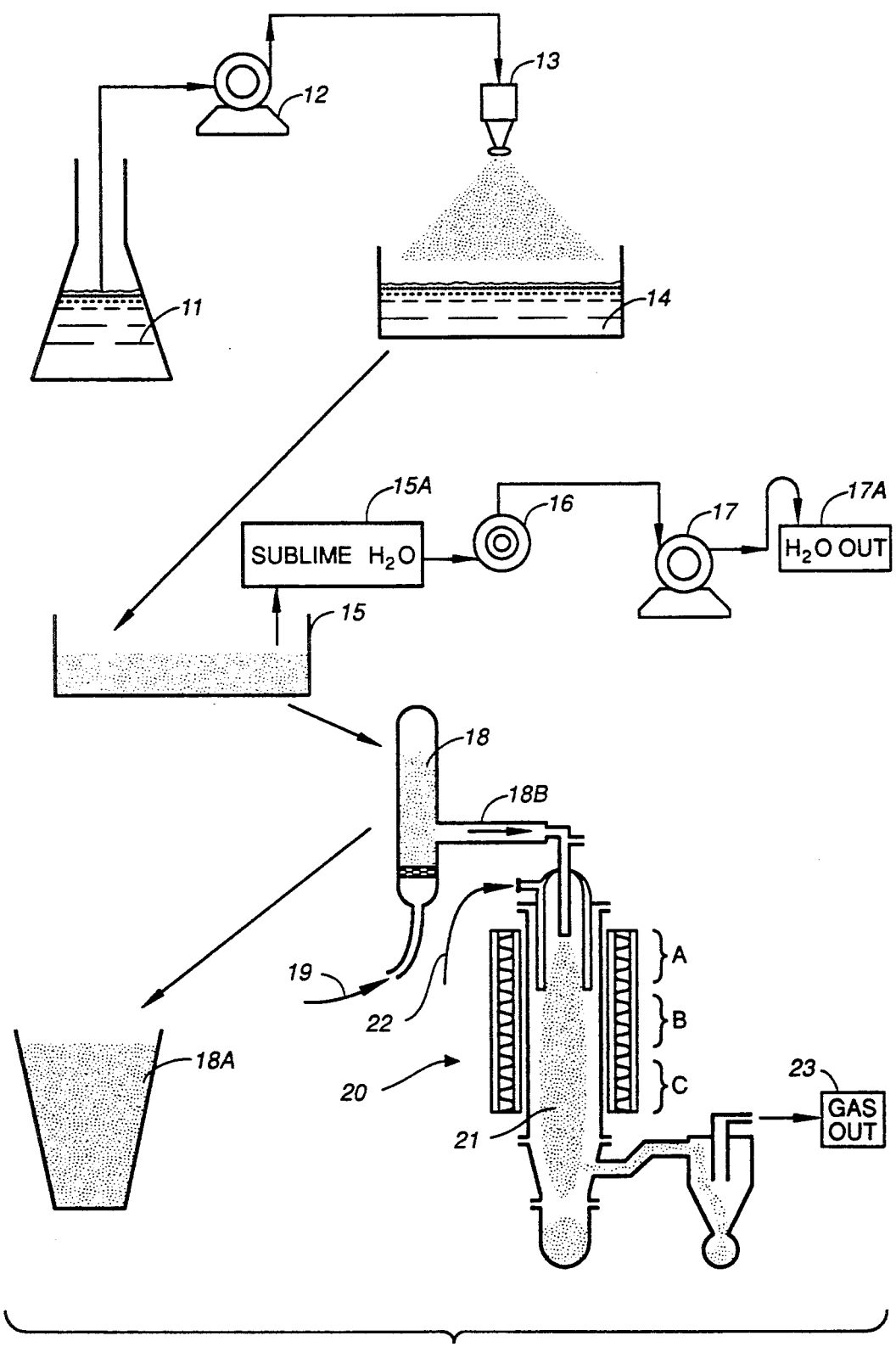
FIG._1

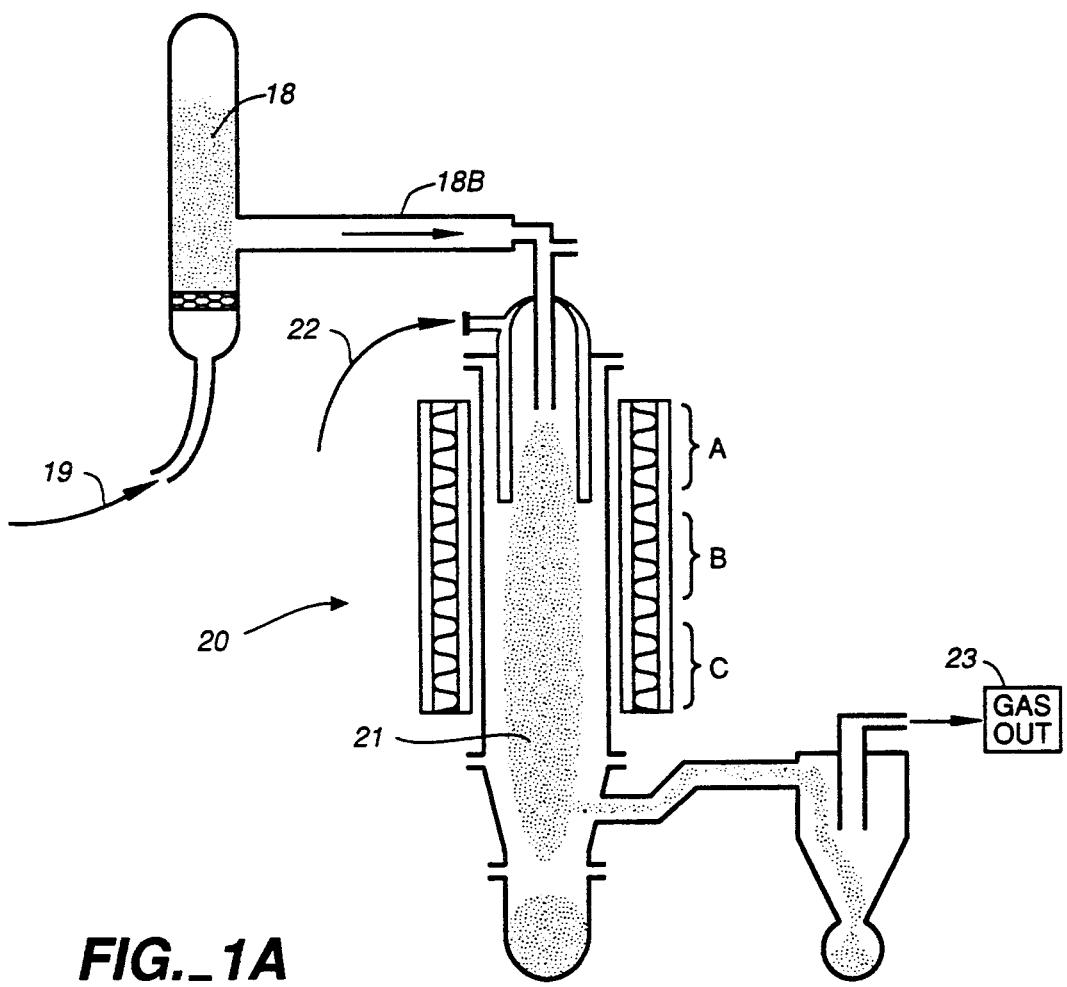
FIG._1A

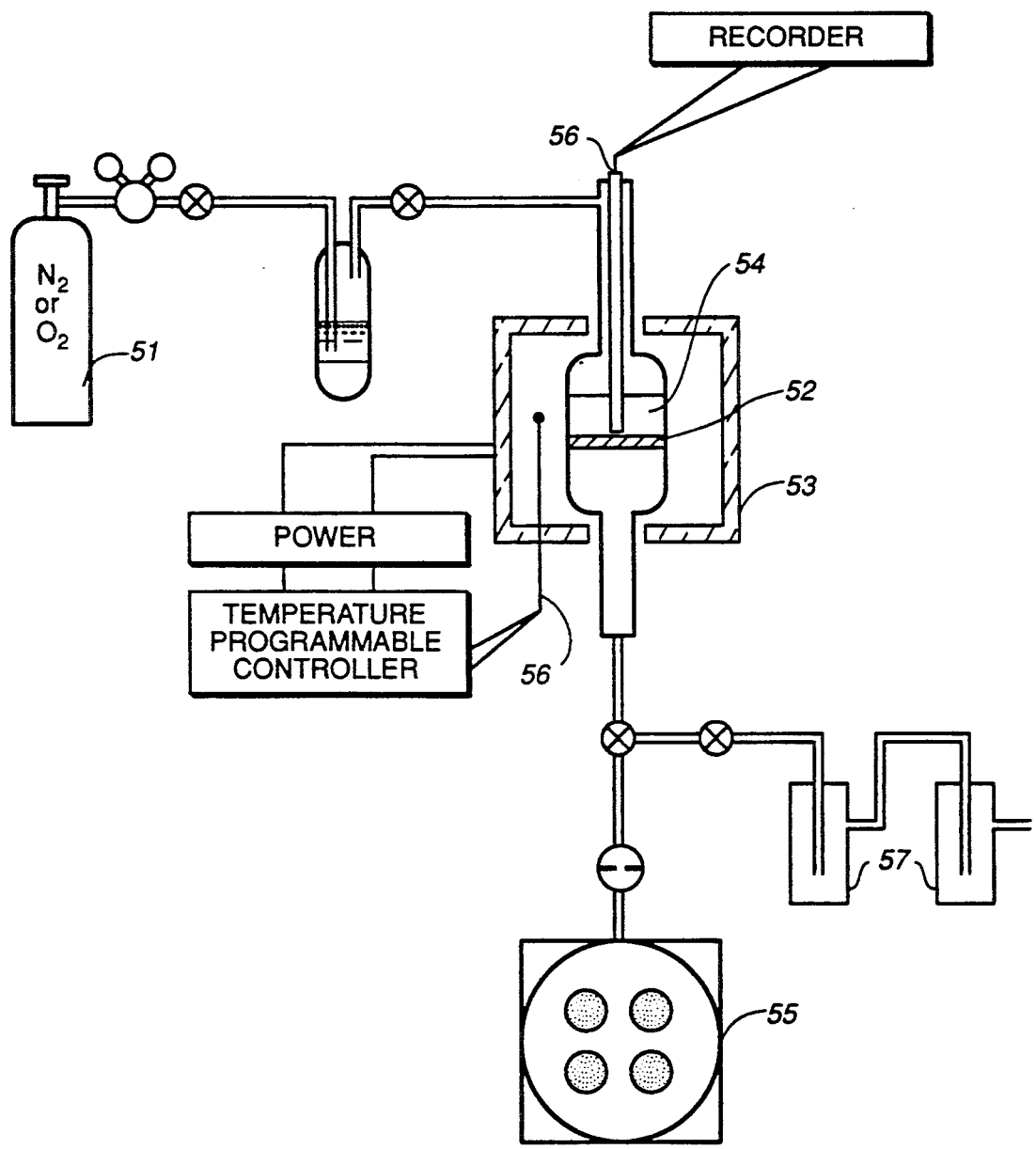
FIG._2

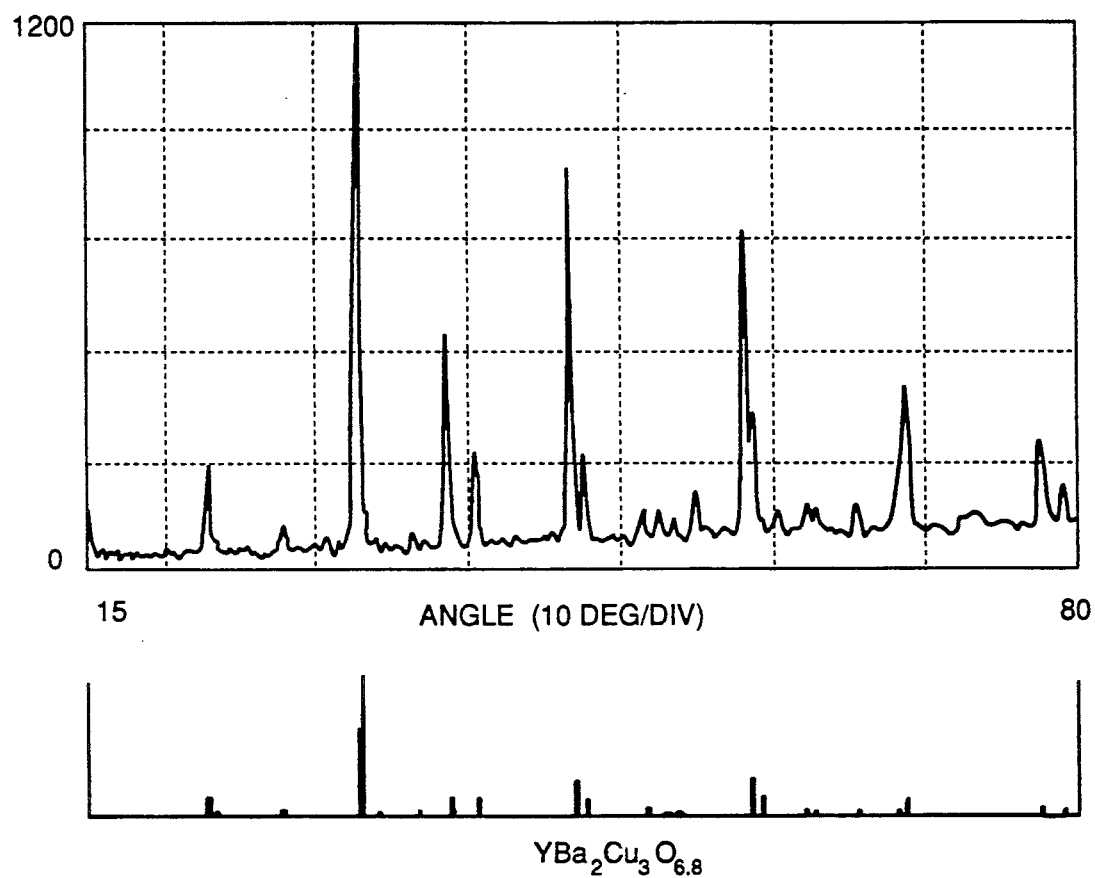
FIG._3

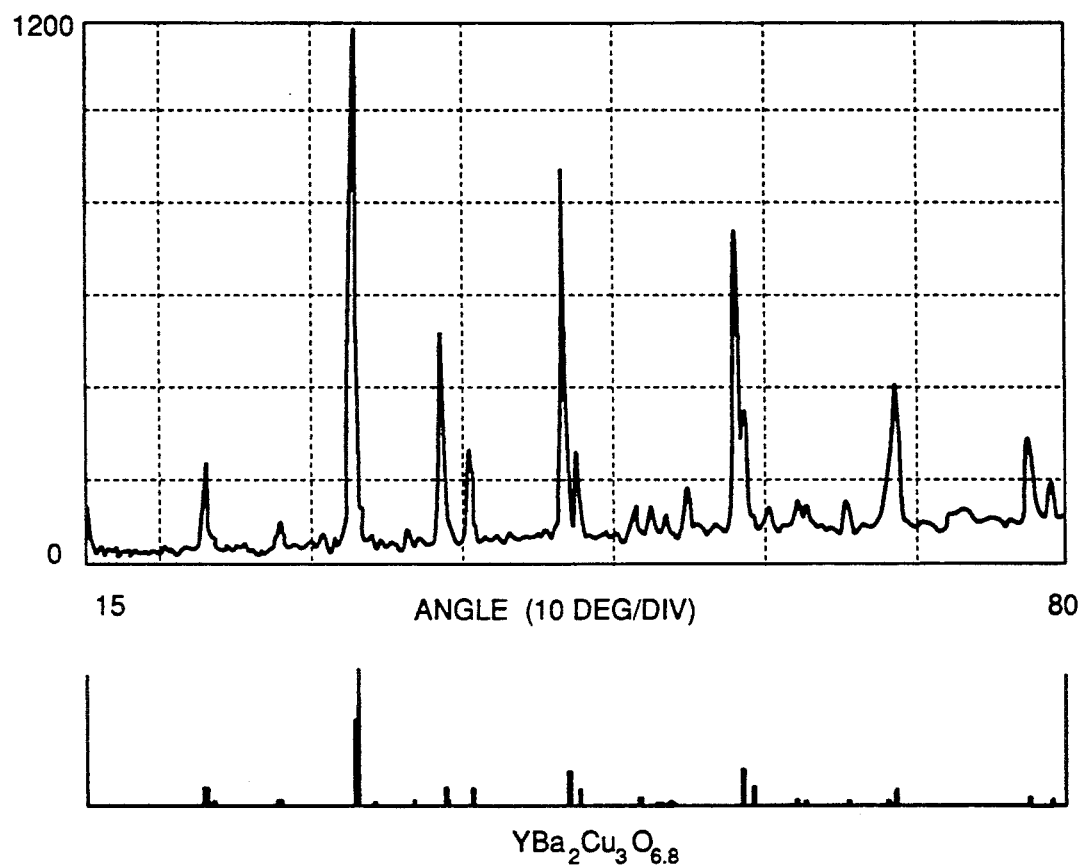
FIG._4A

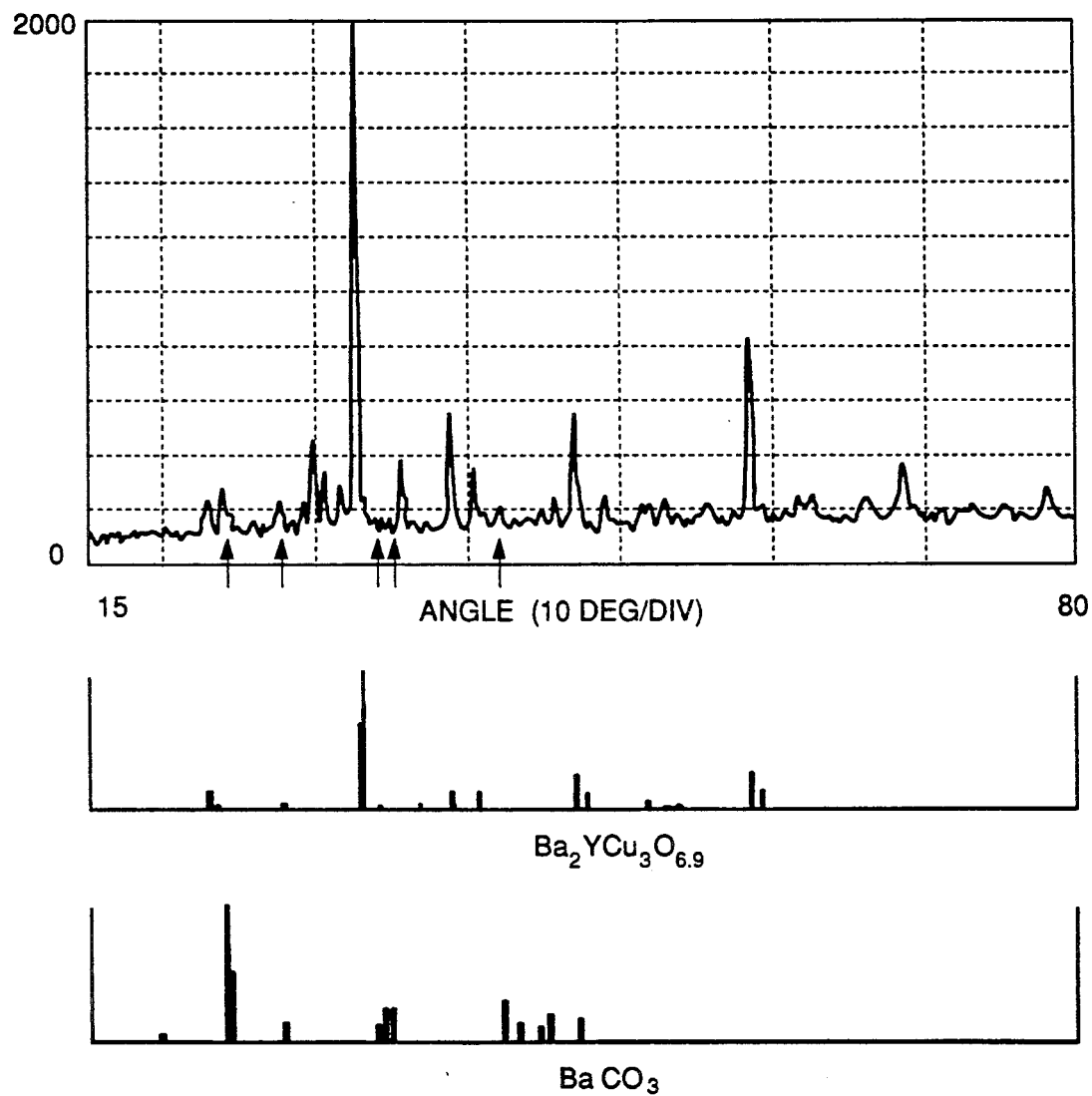
FIG._4B

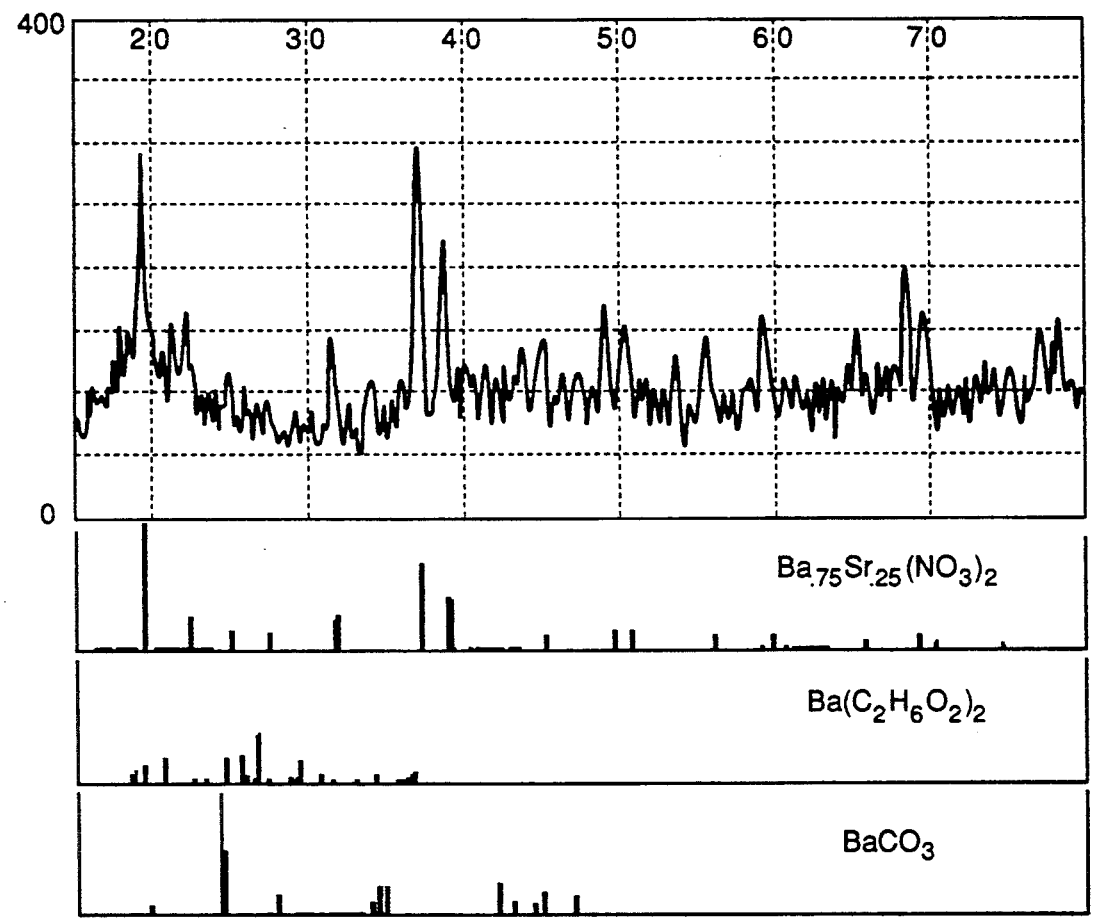
FIG._4C

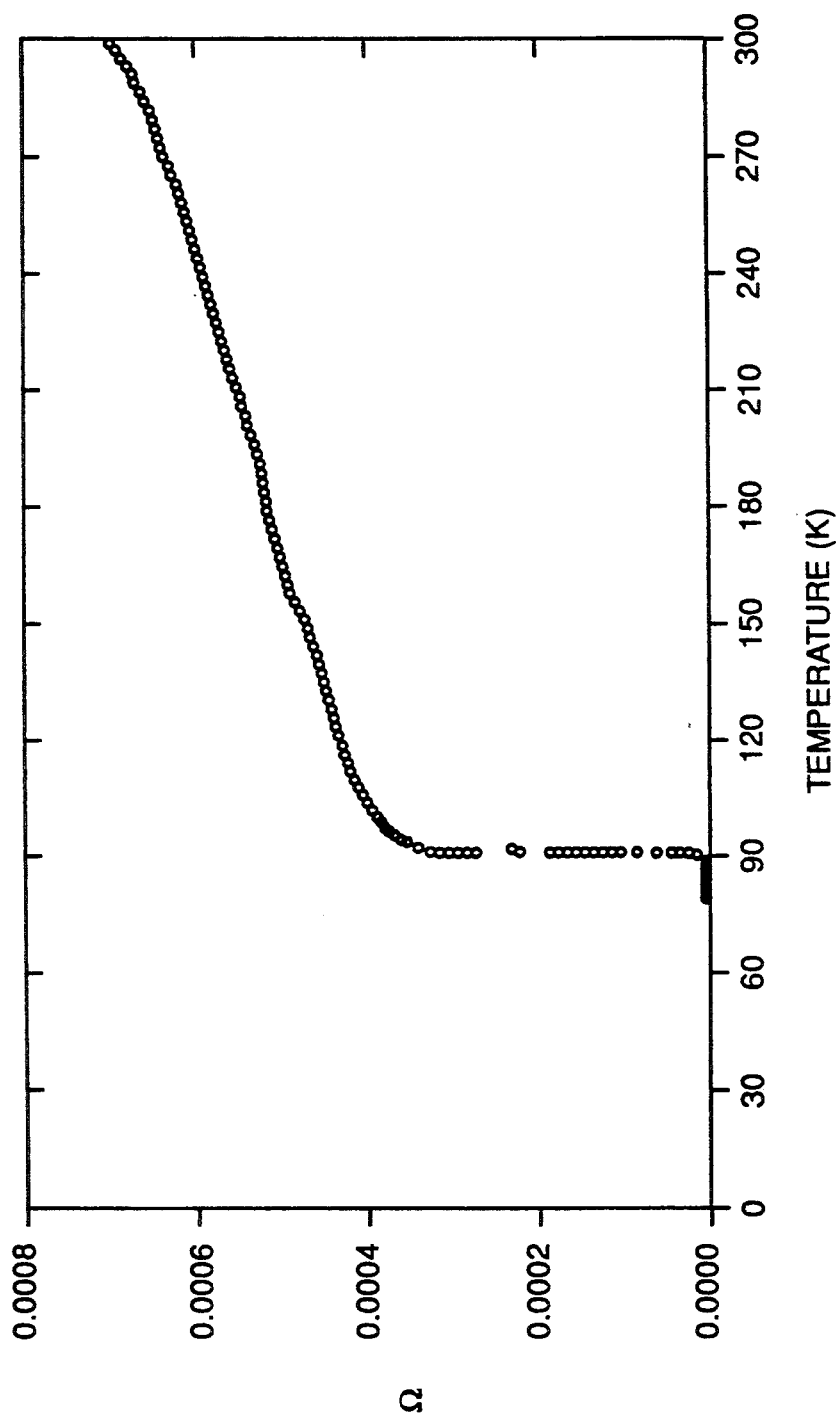
FIG._5

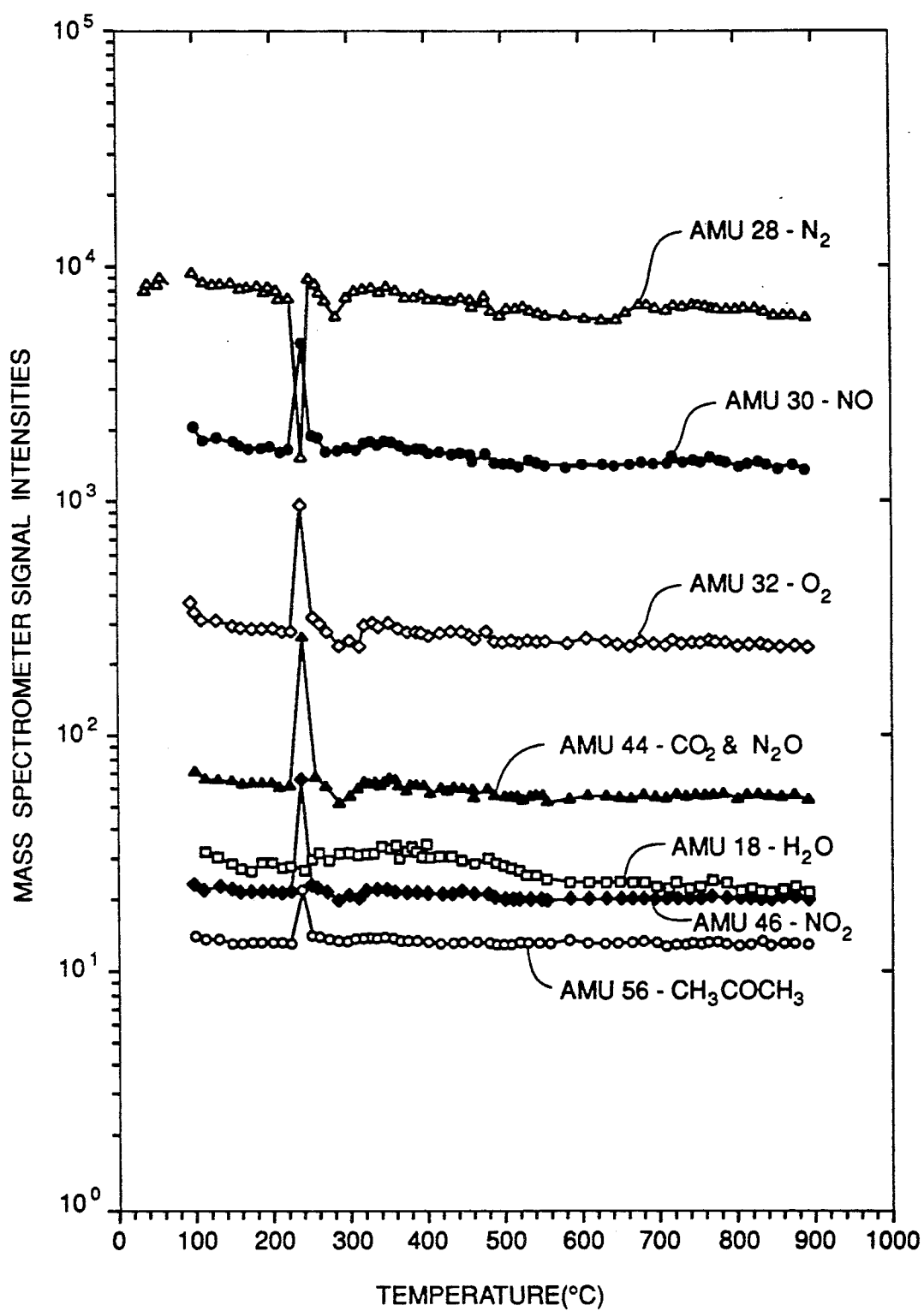
FIG._6

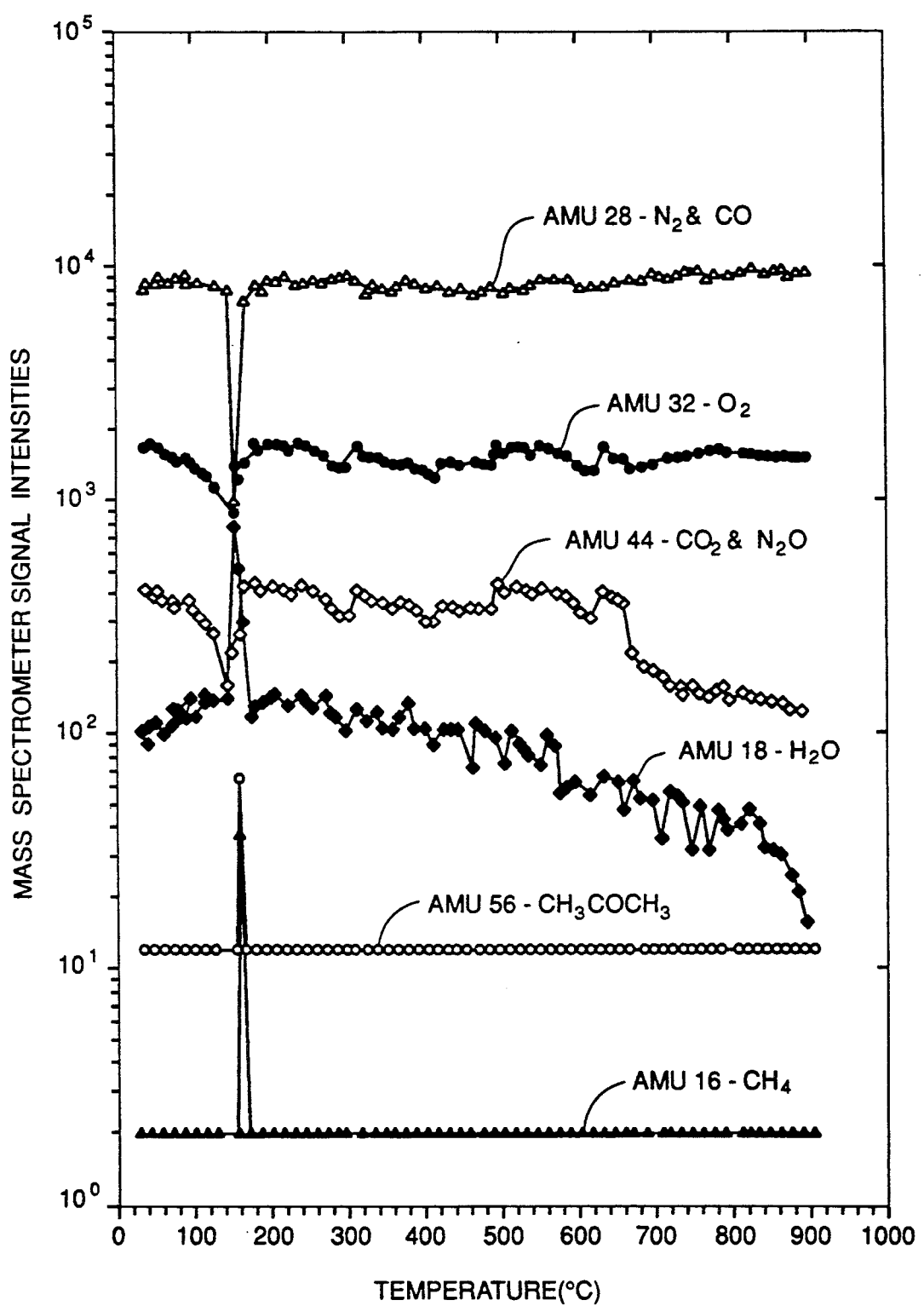
FIG._7

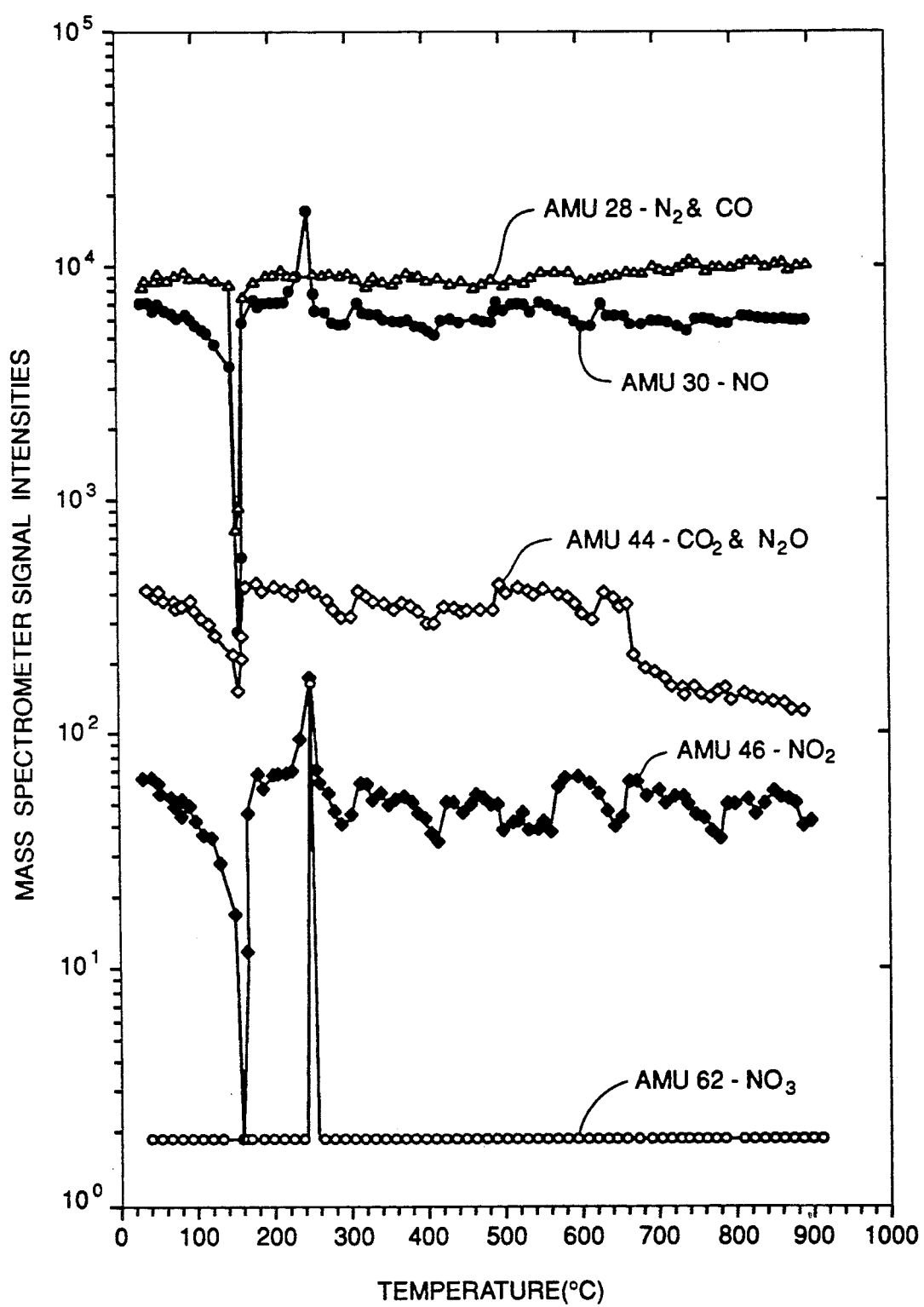
FIG._8

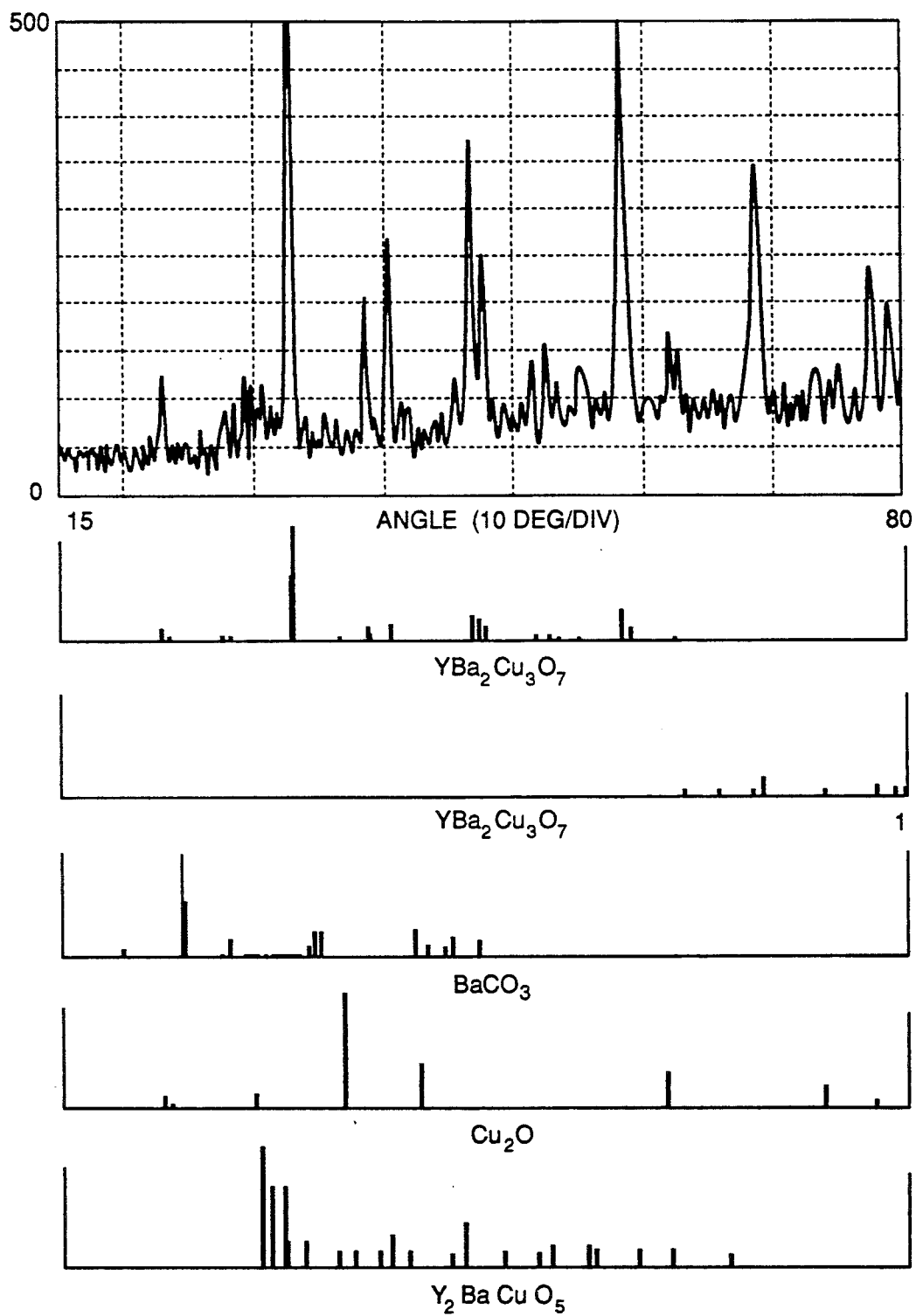
FIG._9

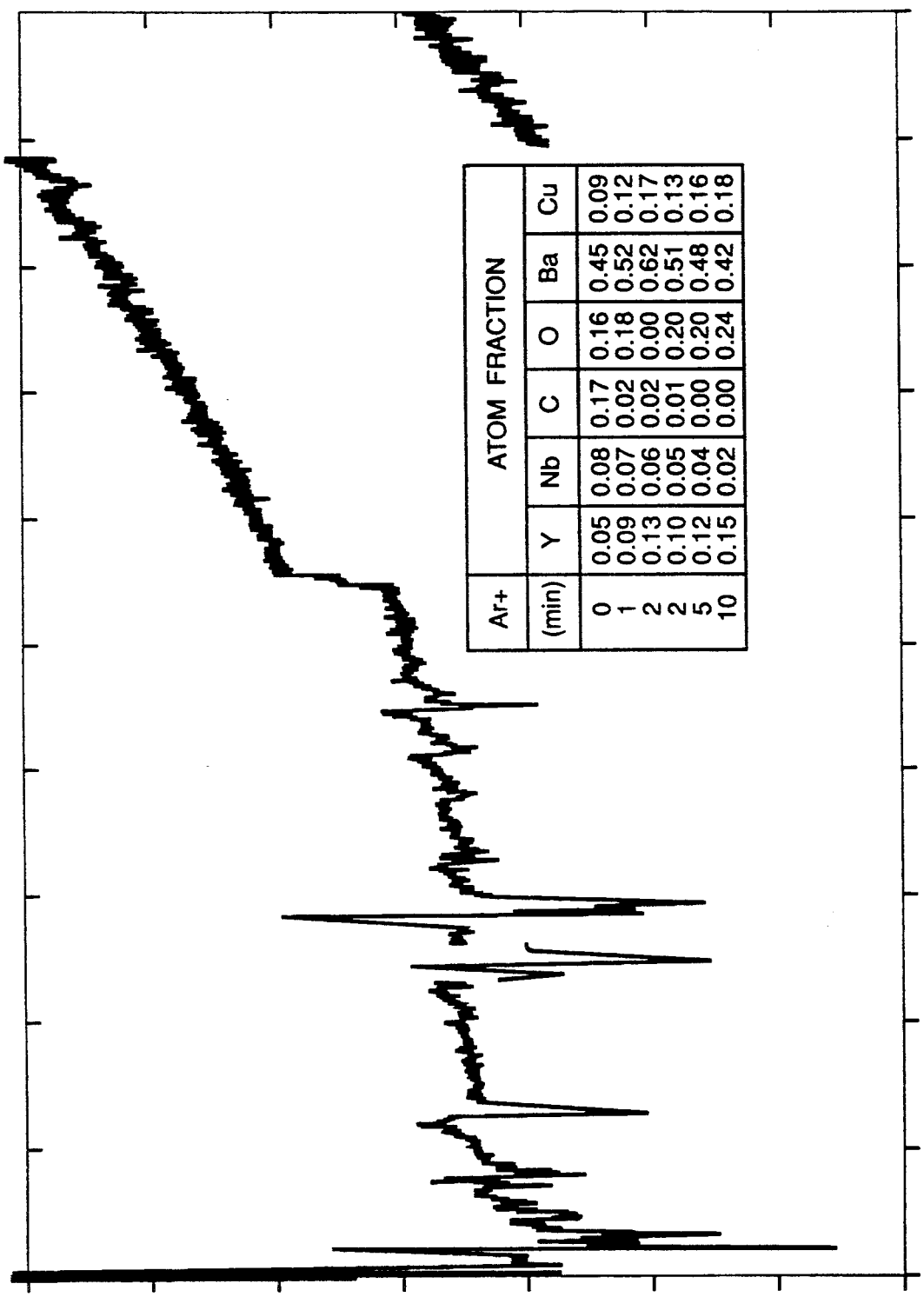
FIG.—10

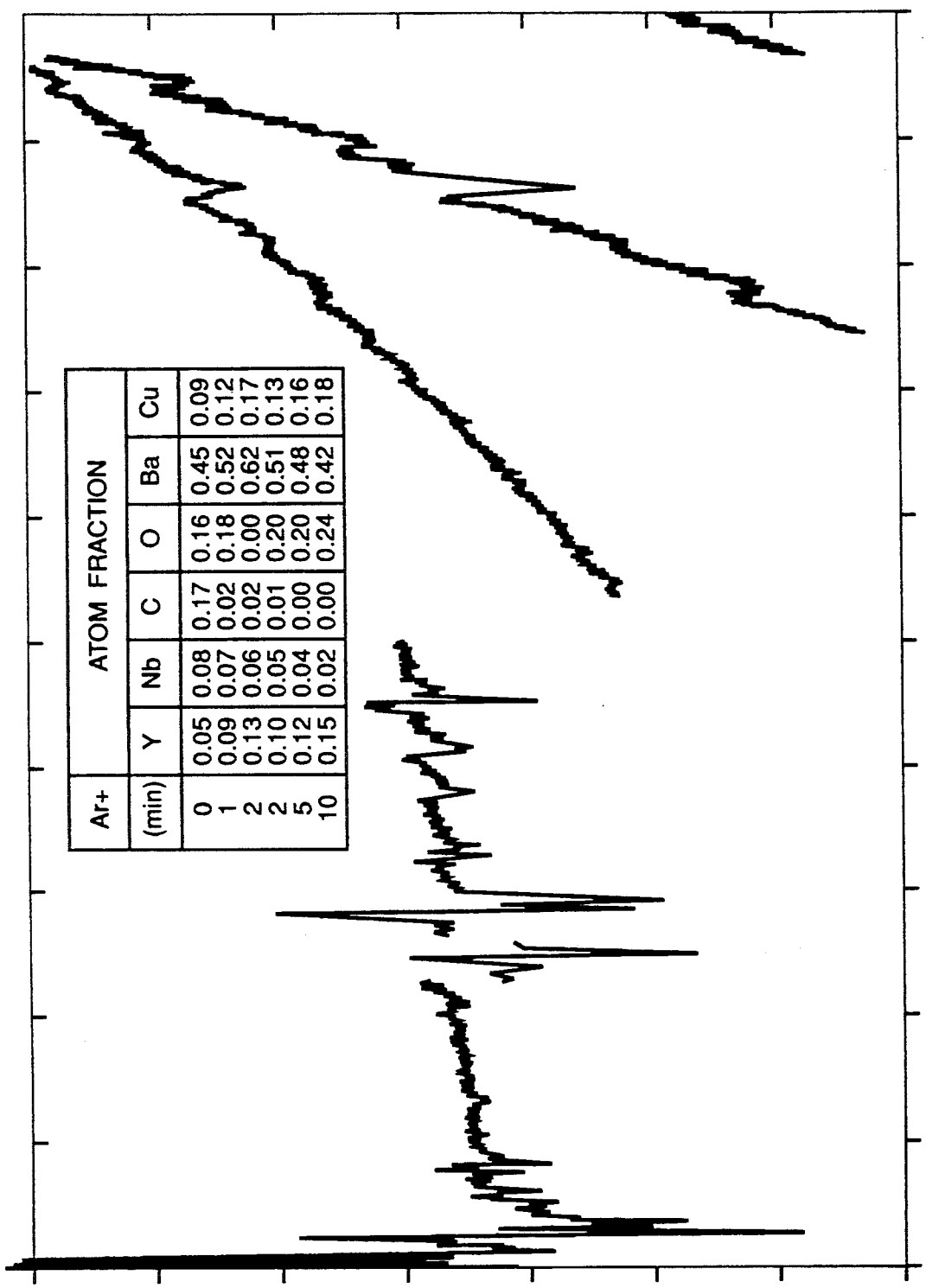
FIG._11

CARBONATE-FREE INORGANIC NITRATES OR OXIDES AND PROCESS THEREOF

ORIGIN OF THE INVENTION

The present invention was made in the course of the Office of Naval Research Contract #N00014-88-C-0705 of the U.S. Department of Defense. The U.S. Government has certain rights in this invention.

BACKGROUND OF THE INVENTION

1. Field of the Invention

The present invention relates to a process for obtaining essentially carbon or carbonate-free inorganic nitrates or oxides. Specifically, the present invention relates to the treatment of a carbon-containing organic or inorganic salt or a mixture of salts with a nitrate-generating group, e.g. $NO_2$, at essentially anhydrous conditions between about 40 and 200° C. to produce a solid carbon or carbonate-free nitrate or mixture of nitrates. The process is particularly useful to produce a mixture of oxides, e.g., $YBa_2Cu_3O_{7-d}$, (where d is between about 0 and 0.7) having high temperature (at or above 90K) electrical superconducting properties, or high performance materials, such as $BaTiO_3$ or barium aluminosilicate (celsian).

2. Description of the Related Art

Various superconducting materials have been produced by processes ranging from mixing and firing oxides, nitrates and carbonates (shake and bake) (M. K. Wu et al., *Physical Rev. Letters*, Vol. 58 pg. 908 (1987)); chemical-vapor deposition (P. H. Dickinson et al., *Applied Physics*, Vol. 66, #1, p. 1 (July 1989)); sol-gel (P. Barboux et al., MRS Fall Meeting Abstracts, 1987; coprecipitation (A. M. Kini et al., Inorganic Chemistry, Vol. 26, Pg. 1834 (1987)); aerosol pyrolysis techniques (T. T. Kodas et al., *Applied Physical Letters*, Vol. 52 #19 pg. 1622 (1988)); or freeze drying techniques (Johnson et al., U.S. patent application Ser. No. 071,977, filed Jul. 10, 1987, now U.S. Pat. No. 4,975,415, issued Dec. 4, 1991).

K. J. Leary et al., in the *Journal of the American Ceramic Society*, Vol. 73 (#4), pg. 904–908 (April, 1990) disclose the use of nitrogen dioxide to improve the superconducting properties of $YBa_2Cu_3O_{7-d}$ (where d is between about 0 and 0.7) (also referred to herein as YBaCuO or as YBCO). However, the nitrogen dioxide is only contacted with the oxide at temperatures of 600° C. or greater for long times. Also see Leahy WO 9006598, published June 14, 1990.

R. B. Cass in U.S. Pat. No. 4,931,213 discloses the preparation of electrically-conductive titanium suboxides.

All references, patents, articles, standard, etc. cited herein are incorporated by reference in their entirety.

The production process may be fairly straight forward such as the shake and bake, or freeze drying approach or be somewhat more complex such as the sol-gel or coprecipitation. A problem encountered in the formation of barium containing superconducting oxides is that barium inorganic salts often have low water solubility. This makes it difficult to obtain proper solution concentrations for the freeze-drying technique described above. To circumvent this solubility problem, organic barium salts (acetates) are fairly water soluble and are used. However, these methods may be suspect because of the observations that the superconducting inorganic oxide may have undesired residual amounts of carbon present even after calcining, annealing and slow cooling. The undesired carbon present in inorganic oxide powders is obtained from carbonates any or other organic carbon moieties. The carbon present in any form is believed to diminish superconducting properties. Therefore, a major problem in most bulk processes to produce a superconducting oxide, or an advanced performance material, is the necessary removal of all potentially contaminating carbon moieties.

The present process provides a nitrogen dioxide, pretreatment method to remove carbon-containing organic and carbon-containing inorganic moieties from a carbon-containing precursor, nitrate or oxide prior to sintering, calcining, slow cooling, annealing, and slow cooling to produce the carbon free oxide. These carbon-free nitrates and oxides are particularly useful to produce improved superconducting oxides or advanced materials.

SUMMARY OF THE INVENTION

The present invention relates to an improved process to produce an essentially carbon-free nitrate of an alkali metal, alkaline earth metal, transition metal, lanthanide metal, actanide metal, metal, or mixtures thereof, which process comprises:

contacting an essentially anhydrous composition of an alkali metal, alkaline earth metal, transition metal, lanthanide metal, actanide metal, metal or mixtures thereof, one or more of which metals are substituted with an organic or an inorganic carbon-containing substitute with flowing nitrogen dioxide, dinitrogen tetraoxide or mixtures thereof at a temperature of between about 40° to 150° C. under essentially anhydrous conditions for a time and at a pressure effective to form the nitrate of the alkaline metal, alkaline earth metal, transition metal, lanthanide metal, actinide metal, or mixtures thereof, essentially free of any carbon containing contaminant.

The present invention relates to the production of higher $T_c$ superconducting oxides having essentially no carbon or carbonate present by first contacting the dry powder with nitrogen dioxide, etc., followed by calcining to about 950° C., maintaining at a temperature up to about 950° C., cooling slowly, annealing, and cooling slowly to ambient temperature, all steps performed in the presence of flowing air or oxygen.

The present invention also relates to the production of inorganic high performance advanced materials having essentially no carbon or carbonate present by first contacting the carbon-containing precursor dry salt with nitrogen dioxide, etc. up to about 200° C., followed by calcining up to about 1400° C., maintaining at 1400° C., optionally slowly cooling, annealing, and slowly cooling to ambient temperature, all in the presence of flowing air or oxygen.

The present invention also relates to an improved process to produce a superconducting oxide comprising a barium oxide essentially free of barium carbonate as a contaminant, which process comprises:

contacting a solid comprising at least one barium compound which contains organic or inorganic carbon group with a nitrate-producing reagent at a temperature of between about 40° and 150° C. under essentially anhydrous conditions for a time and pressure sufficient to remove the carbon moiety present and simultaneously produce barium nitrate. The barium nitrate compound, and other compounds as dry solid are subsequently contacted with temperatures of up to 950° C. in flowing air or oxygen, calcined, slowly cooled, annealed, and slowly cooled to ambient temperature all in the presence of flowing air of oxygen.

The present invention also relates to an improved process to produce a superconducting oxide comprising barium essentially free of barium carbonate as a contaminant, which process comprises:

(a) obtaining a superconducting oxide precursor composition containing barium chemically bonded to an organic or inorganic carbon group, (b) contacting the solid oxide precursor with a nitrate-producing reagent at a temperature of between about 40° and 150° C. under anhydrous conditions for a time and at a pressure sufficient to remove the carbon group present and simultaneously produce barium nitrate and other inorganic nitrates;

(c) heating the precursor composition now containing barium nitrate up to between about 950° C. at a rate of between about 1°–10° C./min. in the presence of excess flowing oxygen or air;

(d) maintaining the oxide at between about 750° to 950° C. for between about 1 and 24 hours in flowing air or oxygen, and (e) slowly cooling the oxide formed in flowing oxygen or air to about 550° C., annealing at 550° to 480° C. over 24 hours in flowing oxygen or air, and then cooling at between about 1°–10° C. min. to ambient temperature in flowing oxygen or air.

The present invention also relates to an improved method of preparing fine particles of superconducting ceramic powders, which method comprises:

(a) dissolving the soluble salts of cations in aqueous medium wherein said soluble salts comprises at least one carbon containing moiety;

(b) obtaining a substantially saturated solution of the salts and adjusting the pH to between about 4 and 7;

(c) atomizing the solution of step (b) onto liquid nitrogen at about −196° C.;

(d) removing the liquid nitrogen by evaporation of the nitrogen under reaction conditions such that the ice-salt crystals do not coalesce into larger particles;

(e) removing the ice by sublimation at reduced pressure under reaction conditions such that the residue does not melt;

(f) heating the solid residue of step (e) to 40°–° C. at reduced pressure under conditions such that the residue does not melt to produce a solid powder residue;

(f) heating the solid residue of step (e) to 40°–60° C. at cient nitrogen dioxide, dinitrogen tetroxide or mixtures thereof at between about 40°–150° C. under anhydrous conditions for a time effective to replace the at least one carbon containing moiety by nitrate;

(g) calcining the solid residue in sufficient oxygen or air at a temperature of between about 200° and 950° C. increasing the temperature at a rate of between about 1 and 10° C./min.; and (g') maintaining the solid residue at between about 850° and 1000° C. for between about 1 sec and 10 hours in flowing oxygen or air;

(h) cooling slowly the solid at a temperature of between about 900° C. to about 550° C. at a rate of between about 1 sec and 10° C./min. in flowing oxygen or air;

(h') annealing the solid at between 550° and 480° C. for between about 10 and 30 hours in flowing air or oxygen; and (h") cooling the solid from about 480° C. to ambient temperature at a rate of between about 1° and 10° C./min. in flowing oxygen or air; and recovering the superconducting solid powder having an average diameter of between about 0.1 and 50 microns.

The present invention also relates to a process to produce a high $T_c$ electrically superconducting article or an advanced material having improved thermal properties, which method comprises:

for the superconducting article (A) combining (i) at least one organic or inorganic metal salt of Group IIA element, (ii) at least one organic or inorganic metal salt of bismuth or a Group IIIA, IIIB, IVA, VA or VB element; and (iii) at least one organic or inorganic metal salt selected from Group IB, IIB, VIII or IVB elements; to produce an aqueous solution wherein the ratio of metal atoms in (i), (ii) (iii) is selected to produce a high $T_c$ electrically superconducting article upon its subsequent high temperature pyrolysis in a flowing oxygen or air atmosphere;

(B) removing water present to produce a powder;

(C) contacting the solid powder with sufficient nitrate-producing reagent to replace any carbon containing group with nitrate and removing the volatile carbon containing group between 40° and 150° C. producing a mixture of nitrate salts;

(D) calcining the solid residue of step (E) in sufficient flowing oxygen or air at a temperature of between 700° and 950° C. for a time effective to produce the corresponding oxides; and (E) slowly cooling the solid obtained at a temperature of between about 950° C. and 550° C. at a rate of between about and 10° C. per minute in excess air or oxygen;

(F) subsequently slowly annealing the mixed metal oxide obtained in flowing oxygen or air at about 500° C. to ambient temperature; and (G) cooling the oxide at a rate of between about 1° and 10° C. per minute in flowing air or oxygen with the proviso that when a superconducting oxide is prepared the maximum temperature in steps (D) and (E) 950° C.; and for the advanced material (A) combining (i) at least one metal salt of a Group IIA element, (ii) at least one metal salt selected from bismuth or a Group IIIA, IIIB, IVA, IVB or VB element: and (iii) optionally at least one metal salt selected from Group IB, IIB, VIII or IVB elements; to produce an aqueous solution wherein the ration of metal atoms in (i), (ii) (iii) upon its subsequent high temperature pyrolysis in a flowing oxygen or air atmosphere;

(B) removing water present to produce a solid powder;

(C) contacting the solid powder with sufficient nitrate-producing regent to replace any carbon containing group with nitrate and removing the volatile carbon containing group between 40° and 150° C. producing a mixture of nitrate salts;

(D) calcining or sintering the solid residue of step (E) in sufficient flowing oxygen or air at a temperature of between about 500° and 1400° C. for a time effective to produce the corresponding oxides; and (E) cooling the solid obtained at a temperature of between about 1400° C. and ambient temperature at a rate per minute to produce the advanced material in excess air or oxygen. The material may be annealed as needed.

Preferably in the process to produce superconducting materials, the Group IIIA, IIIB, IVA, VA elements are each independently selected from bismuth, lanthanum, yttrium, vanadium, praseodymium, lead, thallium, samarium, europium, gadolinium, dysprosium, holmium, terbium or mixtures thereof, the Group IIA elements are each independently selected from barium, strontium, calcium or mixtures thereof, and the Group IB, IIB, IVB or VIII elements are independently selected from platinum, copper, silver, tin or mixtures thereof.

BRIEF DESCRIPTION OF THE DRAWINGS

FIG. 1 is an schematic representation of one embodiment of the production of nitrate from a solid obtained using a freeze-dried process.

FIG. 1A (portion of FIG. 1) is a schematic representation of an entrained flow reaction system (fluidization) used to produce the inorganic nitrate oxide.

FIG. 2 is a schematic representation of a temperature programmed reactor (TPR) system to produce the inorganic oxides.

FIG. 3 is an x-ray diffraction pattern of a $YBa_2Cu_3O_{7-d}$ sample from a barium nitrate precursor after calcining in oxygen at 825° C. for 20 hours with no annealing in the 500° C. range.

FIG. 4A is an x-ray diffraction pattern of a similar sample of FIG. 3 which was sintered at 890° C. and annealed at 550° C. for 20 hours.

FIG. 4B is an x-ray diffraction pattern of a $YBa_2Cu_3O_{7-d}$ sample without a nitrogen dioxide pretreatment. Undesirable barium carbonate is present.

FIG. 4C is an x-ray sample of a $YBa_2Cu_3O_{7-d}$ sample pretreated with nitrogen dioxide at 110° C. for 20 minutes before calcining. No barium carbonate is present.

FIG. 5 is a plot of resistivity ($\Omega$-cm) versus temperature (K) of the $YBa_2Cu_3O_{7-d}$ of FIG. 4C.

FIG. 6 is a plot of the mass spectral fragments of species evolved in the temperature programmed reaction of (TPR see detail below) $YBa_2Cu_3O_7$ in nitrogen only from 10° C./min. up to 900° C.

FIG. 7 is a plot of the mass spectrometer intensities of the species found in the TPR of a $YBa_2Cu_3O_{7-d}$ precursor in nitrogen dioxide/nitrogen up to 900° C.

FIG. 8 is also a plot of the mass spectrometer intensities species generated during a TPR of a $YBa_2Cu_3O_{7-d}$ precursor in nitrogen dioxide/nitrogen up to 900° C.

FIG. 9 is an x-ray diffraction pattern of a nitrogen dioxide/nitrogen treated $YBa_2Cu_3O_{7-d}$ sample of the TPR of FIGS. 7 and 8 compared with x-ray diffraction standards.

FIG. 10 is a spectrum of YBaCuO using Auger electron spectroscopy. The spectrum shown some surface carbon present (0.17) and virtually no carbon at 12 angstroms or more within the layer.

FIG. 11 is a different spectrum of YBaCuO using Auger electron spectroscopy at a later time. The interpretation is the same as for FIG. 10.

DETAILED DESCRIPTION OF THE INVENTION AND PREFERRED EMBODIMENTS

Definitions as used herein:

"Carbon containing inorganic compound" refers to carbonates, carbides, and the like.

"Carbon containing organic compound" includes but is not limited to acetates, propionates, butyrates, etc., tartrates, citrates, oxalates, malates, and the like.

"Continuous Process"—It is to be understood that any of the process steps described herein may be configured in a manner that a continuous stream of solid is contacted with nitrogen dioxide, dinitrogen tetraoxide or mixtures, calcined, heated, cooled slowly, annealed and cooled slowly to ambient temperatures to produce purified product.

"Group IA" elements refers to lithium, sodium or potassium. Lithium is preferred. Group IA can be used in conjunction with the Group IIA elements or alone.

"Group IIA elements" refer to magnesium, calcium, strontium, barium or mixtures thereof. Barium and strontium are preferred. Barium is specially preferred.

"Group IIIB elements" refer to scandium, yttrium or any of the lanthanide elements having an atomic number of 57 to 71 or the actinide elements. Yttrium and the lanthanides from 57 to 71 are preferred. Yttrium is specially preferred.

"Group VA elements" refer to nitrogen, phosphorus, arsenic, antimony, or bismuth. Bismuth is preferred.

"Group IB elements" refer to copper, silver or gold. Copper is preferred.

"Group IIB elements" refer to zinc, cadmium or mercury. Zinc or cadmium are preferred.

"Group IIIA elements" refer to boron, aluminum, gallium, indium of thallium. Thallium is preferred for superconductors Aluminum is preferred for advanced materials.

"Group IVA elements" refer to silicon, germanium, tin, or lead. Tin or lead are preferred.

"Group VIII elements" refer to iron, cobalt, nickel, ruthenium, rhodium, palladium, osmium, iridium or platinum.

"Group IVB elements" refer to titanium, zirconium or hafnium. Titanium or hafnium are preferred.

"Group VB elements" refers to vanadium, niobium tantalum. Vanadium or niobium are preferred.

"High $T_c$" refers to temperatures, warmer than 4° K, preferably at least 30 K. More preferably, the temperature is at or above liquid nitrogen temperatures of 77 K, preferably 90 K or warmer.

"Optionally" means that a group may or may not be present or that a particular step may or may not need to be performed within the present invention.

"Superconducting oxides" refers to a mixture of lanthanide metal, actanide metal, transition metal, alkaline earth metal, metal oxides or mixtures thereof which when properly prepared produce a perovskite or perovskite—like structure which has electrically superconducting properties at temperatures higher than 90 K.

Referring now to FIGS. 1–9, the present invention provides a process to produce metal nitrates (and therefore oxides) which are essentially carbon-free (and carbonate-free).

Superconductino Solid Oxides

The precursor solutions and solid materials are produced according to procedures known in the art, e.g. coprecipitation or freeze-drying (S. M. Johnson, et al. U.S. Ser. No. 71,977, which is specifically incorporated herein by reference.)

In the coprecipitation technique to produce precursor superconducting oxide, the acetates, citrates, oxalates, or nitrates, oxides or the like (where the metals present are originally in a proper ratio) are simply combined by being poured together as aqueous solutions (usually highly concentrated). The pH is adjusted (e.g. using ammonia, ammonium hydroxide, etc.). The precursor compound precipitates and is recovered by filtration and removal of the residual water using reduced pressure. Alternatively, the water is simply removed by evaporation.

In the freeze-drying process, the saturated aqueous solutions (metals in a proper ratio) to ultimately produce a superconductor are combined and immediately spray atomized onto liquid nitrogen. The ice formed is sublimed and removed.

In the freeze drying process as shown in FIG. 1, the salt solution is optionally concentrated (or individual salt solutions which are mixed immediately, 1-5 minutes prior to) spray atomizing onto liquid nitrogen. Ultrasonic nozzles (from Sono-Tek, Poughkeepsie, N.Y.) are used, e.g., type 8700-60 (#51027). The mean droplet size is between about 15 and 50 micrometers, preferably about 30 micrometers.

The liquid nitrogen is evaporated at low temperatures, usually less than $-50°$ C. The ice is then sublimed under controlled low temperature and vacuum conditions, e.g. less coalesce.

The precursor solid powder is then contacted with flowing nitrogen, flowing nitrogen dioxide, dinitrogen tetraoxide or mixtures thereof at about ambient temperature and then heated to between about 40°-150° C. The carbon-containing groups are replaced by nitrate, and the carbon-containing vapor product is removed.

Because of the carbon present in the precursor oxide the temperature of the contact with nitrogen dioxide initially must be below 200° C., preferably 150° C. or less. If the temperature or rate of heating is too rapid, spontaneous decomposition or explosions are encountered.

The time necessary depends upon the volume present. Often one hr. or less is sufficient to remove the carbon present. The nitrates decompose cleanly to produce the corresponding desired mixture of oxides.

Bulk—The anhydrous solid is then heated at a rate of between about 1° and 10° C./min to about 950° C., in flowing oxygen or air maintained at 900°-950° C. in flowing air or oxygen between about for 1 to 24 hours. After slow cooling at 1°-10° C./min. to about 500° C. in flowing air or oxygen, the sample is annealed at about 500° C. for between about 1 to 24 hours in flowing air or oxygen, then cooled slowly at a rate of between 1° to 10° C./min in flowing air or oxygen.

Analysis by x-ray diffraction analysis shows that essentially no carbon (as undesirable carbonate) is present. (FIG. 9)

Resistivity measurements ($-$cm) of the pressed powder show that the sample has superconducting properties at about 90 K and higher.

The present superconducting material produced by this nitrogen dioxide pretreatment process appears (by XRD) to be forming at temperatures lower than any yet reported (see material heated to 825° C. for 20 hours.)

Entrained Flow Reactor—As seen in FIG. 1A, the nitrates are added to the top of the reactor in flowing oxygen or air. Region A can be 800°-1000° C. Within 1 to 5 seconds the oxides are formed and rapidly cooled (1-5 sec) in Region B to Region C to about 100° C. The oxides can then be heated to about 950° C. and cooled and annealed all in flowing oxygen or air as described herein.

An aspect of the present invention is that the superconducting powders sintered compacts produced from the show a minimum of twinning, i.e. less than 0.5%, essentially in the absence of twinning. Twinning in this art is believed to occur in the polycrystaline YBaCuO because of the strain induced in this material, by the uptake of oxygen during the transition of the material from the tetragonal phase to the superconducting orthorhombic phase. If twinning is present in these samples, it is below the detection limit of the analysis by optical micrographs taken at 1000 power.

The Auger spectra (FIG. 10 and 11) are surface measurements of the same sample of $YBa_2Cu_3O_{7-d}$ taken several days apart. A vacuum of 10-11 milli Tor is present. As can be seen, only the top layer has any minor carbon. The low carbon levels in deeper layers is at the detection level for the analysis method.

High Performance Advanced Materials

The present process is also useful to produce high purity advanced performance materials, such as $BaTiO_3$ or celsian, $BaAl_2Si_2O_8$. The calcining temperature is about 500° C., and the sintering temperature maybe 1400° C. or higher.

Seeding—In additional embodiments, fine powder particles (or seeds) of an oxide compound may be suspended in the stirred precursor solutions and carried along with them as they are spray atomized into liquid nitrogen or coprecipitated. These seed particles then serve as nucleation sites to encourage the formation and growth of crystalline particles of the desired composition or phase structure. This is the case for $YBa_2Cu_3O_{7-d}$ or the monoclinic structure form of celsian (barium aluminosilicate). These seeds may also influence the size and shape of particles formed from the solutions. Another use of the seed particles is to produce products with a mixed phase structure, such as BiSrCaCu oxide superconductor, as a grain boundary phase in $YBa_2Cu_3O_{7-d}$.

While not wanting to be bound by theory, it is believed that the carbonate is present in the final superconducting oxides because, as the carbon-containing metal salt is thermally decomposed, carbon dioxide is produced at the elevated temperature. This carbon dioxide combines with barium oxide present to produce the undesirable stable barium carbonate. In the present invention, the barium acetate (oxalate, etc.) is reacted with nitrogen dioxide to produce the barium nitrate. It is believed that essentially anhydrous conditions are present. However, the desired salts may have 1-9 waters of hydration, and also include up to about 0.5 percent by weight of additional water. The nitrogen dioxide probably reacts with water under the higher temperatures to produce energetic essentially pure $HNO_3$ in situ. The nitric acid then reacts with the salts to produce the desired nitrates.

General Experimental Description

The temperature-programmed reaction (TPR) technique (See FIG. 2) is used to characterize the reactive species in the YBaCuO freeze-dried precursor's decomposition and reaction chemistry. The reactor and process design is used to produce carbonate-free YBaCuO powder.

In one TPR experiment, a dilute stream of reactant gas is continuously passed over the sample (prepared by freeze-drying techniques) oxide precursor at a fixed rate. The sample is then heated at a known linear rate as the reaction products are monitored by quadruple mass spectrometer (FIG. 2). A thermocouple attached to the outside of the microreactor is used as feedback for controlling the heating rate in order to avoid overheating. A thermocouple situated inside the reactor bed is used to monitor the actual reaction temperature.

A 0.5 g sample of freeze-dried precursor powder is loaded into a quartz microreactor under a nitrogen atmosphere, sealed and transferred to a TPR system. The TPR experiments are performed at a heating rate of 1–10°/min. up to 900° C. in these different environments: $N_2$, $O_2$, $NO_2/N_2$, $NO_2/N_2$, $N_2O/N_2$, and $NH_3/N_2$.

Table 1 on the next pages shows a number of the test reaction conditions used to pretreat the superconducting oxide precursor. Run 18 using nitrogen dioxide is preferred as a test example.

TABLE 1

| TPR RUN | Reactant Gases & Temperature Profile | YBCO | 2-1-1 | BaCO$_3$ | CuO | Y$_2$O$_3$ | Other |
|---|---|---|---|---|---|---|---|
| 1 | N$_2$ → 100, 900, 500, 100 | VS | W | VW | ∅ | ∅ | M |
| 2 | N$_2$ → 100, 900, 500, 100 | VS | W | W | ∅ | ∅ | S |
| 3 | O$_2$ → 100, 900, 500, 100 | VS | VW | S | VW | W | |
| 4 | N$_2$O → 100, 900, 500, 100 | M | ∅ | VS | S | ∅ | |
| 5 | N$_2$/NO$_2$ → 100, 900, 500, 100 | VS | W | ∅ | ∅ | VW | |
| 6 | NH$_3$ → 100, 900, 500, 100 | ∅ | ∅ | S | ∅ | W | VS {Cu°} |
| 7 | N$_2$/NO$_2$ → 100, 900, 500, 100 | VS | W | ∅ | ∅ | ∅ | S |
| 8 | N$_2$/N$_2$O → 100, 900, 500, 100 | VS | W | VW | VW | ∅ | |
| 9 | N$_2$/HNO$_3$/H$_2$O → N$_2$O → 100, 625, 900, 500, 100 | VS | W | ∅ | ∅ | ∅ | W {Y$_2$BaO$_4$} |
| 10 | N$_2$/HNO$_3$/H$_2$O → N$_2$O → 100, 625, 900, 500, 100 | ∅ | ∅ | ∅ | M | ∅ | S {Ba(NO$_3$)$_2$} |

TABLE 1-continued

| TPR RUN | Reactant Gases & Temperature Profile | YBCO | 2-1-1 | BaCO₃ | CuO | Y₂O₃ | Other |
|---|---|---|---|---|---|---|---|
| 11 | NO → (100 → 900 → 500 → 100) | M | ∅ | VS | M | ∅ | |
| 12 | N₂ → N₂/HNO₃/H₂O (100 → 325) ; N₂O → (900 → 500 → 100) | VS | M | ∅ | ∅ | ∅ | |
| 13 | N₂ → N₂/HNO₃/H₂O (100 → 325) ; N₂O → (900 → 500 → 100) | VS | ∅ | ∅ | ∅ | W | |
| 14 | N₂ → N₂/HNO₃/H₂O → N₂O → (100, 325, 900, 500, 100) | S | S | ∅ | W | ∅ | |
| 15 | NO → N₂O → (100 → 650 → 900 → 500 → 100) | ∅ | M | ∅ | S | ∅ | S |
| 16 | NO → O₂ → (100 → 650 → 900 → 500 → 100) | S | ∅ | M | ∅ | ∅ | VS |
| 17 | NO → O₂ → (100 → 650 → 900 → 500 HOLD 30 min. → 100) | VS | W | S | ∅ | ∅ | |
| 18 | N₂/1% NO₂ → O₂ → (100 → 650 → 900/980 → 500 → 100) | VS | W | ∅ | ∅ | ∅ | |

Foot Notes Regarding Table 1

In Table 1 are described 18 TPR runs performed under somewhat different processing conditions. For example, Run 1 is a TPR of a YBaCuO sample in flowing nitrogen from 100° C. to 900. at a rate of heating of 10° C./min. The sample is not held at 900° C. The sample is then allowed to cool in flowing nitrogen at 5°–10° C./min. The sample is not annealed at 500° C., but is cooled in flowing nitrogen to 100° C.

The other Runs are performed in a similar manner.

Run 18 is the contacting of YBaCuO powder with flowing 1% nitrogen dioxide/nitrogen from about 100° to 900° C. at a rate of heating of 10° C./min. at 900° C. The nitrogen dioxide is topped and flowing oxygen is introduced. The rate of cooling from 900° C. to 100° C. is a rate of 5°–10° per min. This sample produced in this run did not have carbon present.

YBaCO is $YBa_2Cu_3O_{7-d}$.
2-1-1 is presence of $Y_2BaCuO_{7-d}$.
Cu is copper oxide.
$Y_2O_3$ is yttrium oxide.
Other is other unidentified compounds.
0 is essentially zero.

The following Examples are provided to be illustrative and descriptive only. They are not to be construed as limiting in any way.

PREPARATION A

Preparation of $YBa_2Cu_3O_{(7-d)}(d=0-1)$ (without nitrogen dioxide treatment)

(a) To a 2,500-ml beaker at STP containing a magnetic stirring bar and 1000 ml of distilled water is added 66.833 g of barium acetate (0.262 mol, 99.9% purity from Johnson-Matthey of Seabrook, N.H.). Yttrium nitrate, (99.9%) 50.00g (0.131 mole) also from Johnson Matthey, in 500 ml of distilled water is added next. Next is added 100 g of copper nitrate. $3H_2O$ (0.393 mol of 99% purity), also from Johnson Matthey. The components are all in solution after heating at 90° C. for 16 hours (overnight), pH about 4. The two liters of aqueous solution are spray atomized onto 4 liters of liquid nitrogen using a thin layer chromatography spray nozzle or an ultrasonic nozzle type 8700-60 from Sono-Tek, Poughkeepsie, N.Y., over a 2.5 hr. period. The liquid ammonia is then removed by evaporation using a slight vacuum. While the ice/salt crystals are still at a very low temperature, vacuum system is attached, and the ice is sublimed at 150 mTorr. Next, the solid is allowed to heat for 4–16 hours at 40°–60° C. under a vacuum of 300 mTorr. The sample is immediately calcined in flowing oxygen starting at 200° C. and increasing the temperature to 895° C. over a 4 hr period. The oxides formed are then cooled in flowing oxygen (1.5 l/min.) to ambient temperature. The particles obtained have a size of between about 0.5 and 2 microns. When the oxide $YBa_2Cu_3O_{7-d}$ where d is 0–0.7, is tested for superconductivity, the oxide has a Tc of about 90 K or warmer.

(b) To obtain copper nitrate useful in step (a), pure copper metal is contacted with excess anhydrous nitric acid. The copper nitrate solution is separated, titrated to determine the concentration, and is used immediately to avoid carbon dioxide and water contamination.

(c) In one process, the copper nitrate of step (b) is combined with the yttrium nitrate and freshly prepared barium acetate. The solutions are combined, immediately mixed, and spray atomized within 5 minutes, onto liquid nitrogen to avoid carbon dioxide contamination.

EXAMPLE 1

Barium Nitrate Formation in $YBa_2Cu_3O_{7-d}$ (a) 25 Grams of freeze dried precursor composition (powder prepared in the same manner as previously described prior to calcining at 200° C. in U.S. patent application Ser. No. 71,977—Preparation A) is loaded into a quartz reactor of 1–3" diameter having a 3" height of Rashig rings (quartz) under ¼" layer of alumina felt (or a reaction fitted with a quartz frit) to support the freeze-dried precursor powder bed. The bed is useful in height from 1–4" e.g. (1.5") before fluidization.

Dry powder is added to the reactor under an anhydrous nitrogen atmosphere because of the highly hygroscopic nature of the precursor powder.

The fluidized bed is initially fluidized using anhydrous nitrogen gas. This initial fluidization proceeds with a slow warming of the bed from 40° C. to 100° C. in the presence of nitrogen. Nitrogen dioxide is then slowly added at about 75° C. and higher to avoid exothermic reaction. The nitrogen dioxide gas is slowly introduced into the gas stream via either a $NO_2$ bubbler or a heated sample cylinder containing liquid $NO_2$. Nitrogen dioxide concentration reaches 1–60 volume percent, (e.g. nitrogen dioxide nitrogen e.g., 25/75; V/V). The temperature of the fluidized bed is either maintained at 100° C. or slowly raised at 2°/C./ min to about 130° C. An explosive reaction can occur at about 145° C. or above if the heating rate is too fast. The displacement of the acetate groups from the barium acetate is allowed to proceed under the $NO_2$ gas mixture at about the elevated temperature of 110° C. for 10–30 min. After acetate removal and nitrate substitution is complete, the reactor and product is allowed to cool with either an anhydrous $N_2$ or $NO_2/N_2$ gas flow through the fluidized bed.

The cooled reactor contents are emptied under anhydrous $N_2$ and placed into a warm dry alumina crucible. The crucible is then placed directly into a calcining furnace preheated to 200°–350° C. with $O_2$ flowing at 0.5–1 L/min. Alternatively, the reactor contents in powder form are added directly to a an entrained flow vertical reactor at 900° C. in flowing oxygen.

(b) The oxides of subpart (a) are heated at 850° to 950° C. for 1–4 hours and cooled slowly at 1°–10° C. per minute in flowing oxygen or air to 550° C., annealed from 550° to 480° C. over 24 hours and cooled at 1°–10° C./min to ambient temperature. A useful superconducting oxide powder is obtained.

Barium Titanate (c) Barium titanate ($BaTiO_3$) is formed as described in Example 1 (a) and 1(b) above except that the spray solutions contain the required amounts of $Ba(C_2H_3O_2)_2$ and titanium n-butoxide as the reactants to produce this oxide. The calcining and maintained temperature in Example 1(b) is up to 1400° C.

Celsan (d) Barium aluminosilicate Celsan is formed as described in Example 1(a) and 1(b) above except the spray solutions contain the required amounts of $Ba(C_2H_3O_2)_2$, silicon tetraethyl orthosilicate or colloidal silica, and aluminum n-propionate as the reactants. Seeds of monoclinic celsan may be included in the spray atomization to encourage the growth of the desired monoclinic crystal structure. The calcining and maintained temperature in step 1(b) is up to 1400° C.

EXAMPLE 2

Coprecipitation (a) The procedure of Example 1 is repeated except that the dry $YBa_2Cu_3O$; precursor powder is obtained by coprecipitation of the appropriate salts followed by removal of the water by evaporation or sublimination of the water present.

EXAMPLE 3

Barium Titanate

The procedure of Example 1 is repeated except that barium acetate and titanium nitrate are present in the ratio necessary to ultimately produce $BaTiO_3$. The calcining and heating temperature is also up to 1400° C. for 10 hours. The special cooling and annealing steps are not necessary. Barium titanite essentially free of carbon impurity having improved thermal properties is obtained.

EXAMPLE 4

Barium Aluminosilicate

The procedure of Example 3 is repeated except that acetate and aluminum nitrate 0.9H$_2$O and silicon tetraethyl orthosilicate are each originally present in a ratio to ultimately produce BaAl$_2$Si$_2$O$_x$ essentially free of carbon contaminant having improved thermal properties. Special cooling of annealing steps are optional.

While only a few embodiments of the invention have been shown and described herein, it will become apparent to those skilled in the art that various modifications and changes can be made in the process to produce essentially carbon-free inorganic oxide powders which are useful as superconducting oxides or other advanced materials without departing from the spirit and scope of the present invention. All such modifications and changes coming within the scope of the appended claims are intended to be carried out thereby.

We claim:

1. An improved process to produce an essentially carbon-free nitrate independently selected from an alkali metal, alkaline earth metal, transition metal, lanthanide metal actinide metal, or mixtures thereof, which process comprises:

contacting an essentially anhydrous composition of an alkali metal, alkaline earth metal, transition metal, lanthanum metal, actinide metal, or mixtures thereof at least one of which are substituted with an organic or an inorganic carbon-containing substituent;

with flowing nitrogen dioxide, dinitrogen tetroxide or mixtures thereof at a temperature of between about 100° to 150° C. under essentially anhydrous conditions for a time and at a pressure effective to remove carbon the group present and to form the nitrate of the alkaline metal, alkaline earth metal, transition metal, lanthanide metal, actinide metal, or mixtures thereof essentially free of any carbon containing contaminant wherein the composition is the combination of lanthanide metal, alkaline earth metal and transition metal present in a ratio to each other to produce an electrically superconducting oxide, upon subsequent processing.

2. The process of claim 1 wherein the carbon-free nitrate compounds comprise yttrium, barium and copper.

3. An improved process to produce a superconducting oxide comprising barium essentially free of barium carbonate as a contaminant, which process comprises:

(a) obtaining a superconducting oxide precursor composition containing barium chemically bonded to an organic or inorganic carbon group, (b) contacting the oxide precursor with a nitrate-producing reagent at a temperature of between about 100° and 150° C. under anhydrous conditions for a time and at a pressure sufficient to remove the carbon group present and simultaneously produce barium nitrate and other inorganic nitrogen containing compounds, (c) heating the precursor composition now containing barium nitrate up to 950° C. at a rate of between about 1°–10° C./min. in the presence of excess flowing oxygen or air; and (d) maintaining the oxide at 950° C. for between about 1 and 6 hours, (e) slowly cooling the oxide formed in flowing oxygen or air to about 550° C., annealing at 550° to 480° C. over 24 hours and cooling at 1–10° C. min. to ambient temperature.

4. The process of claim 3 wherein the superconducting oxide precursor of step (a) comprises (i) barium acetate, barium propionate, barium citrate, barium oxalate, barium tartrate or mixtures thereof;

(ii) lanthanum nitrate, yttrium nitrate or mixtures thereof; and (iii) copper nitrate.

5. The process of claim 4 wherein the superconducting oxide precursor comprises barium acetate, yttrium nitrate and copper nitrate; the nitrate-producing reagent is nitrogen dioxide present in 1–60 percent in an inert gas and the contact time is up to 59 minutes.

6. An improved process of preparing fine particles of superconducting ceramic powders, which method comprises:

(a) dissolving the soluble salts of cations in aqueous medium wherein said soluble salts comprises at least one carbon containing moiety;

(b) obtaining a substantially saturated solution of the salts and adjusting the pH to between about 4 and 7;

(c) atomizing the solution of step (b) onto liquid nitrogen at about −196° C.;

(d) removing the liquid nitrogen by evaporation of the nitrogen under reaction conditions such that the ice-salt crystals do not coalesce into larger particles;

(e) removing the ice by sublimation at reduced pressure under reaction conditions such that the residue does not melt;

(f) heating the solid residue of step (e) at 40°–60° C. at reduced pressure under reaction conditions such that the residue does not melt to produce a solid powder residue;

(f') contacting said solid powder residue with sufficient nitrogen dioxide, dinitrogen tetroxide or mixtures thereof at between about 100°–150° C. under anhydrous conditions for a time effective to replace the at least one carbon-containing moiety by nitrate;

(g) calcining the solid residue in sufficient flowing oxygen or air at temperature of between about 200° and 895° C. at a rate of between about 1° and 10° C./min.; and (g') maintaining the solid residue at between about 850° and 900° C. for between about 0.001–10 hours in flowing oxygen or air;

(h) cooling slowly the solid at a temperature of between about 900° C. to about 550° C. at a rate of between about 1° and 10° C./min. in flowing oxygen or air;

(h') annealing the solid at between 550° and 480° C. for between about 10 and 30 hours in flowing oxygen or air; and (h") cooling the solid from about 480° C. to ambient temperature at a rate of between about 1° and 10° C./min. in flowing oxygen or air; and (i) recovering the superconducting solid powder having an average diameter of between about 0.1 and 50 microns.

7. The process of claim 6 wherein in substep (b) the pH of about 4 to 7 of the aqueous solution is obtained by treating the aqueous medium with ammonia or ammonium hydroxide.

8. The process of claim 6 wherein the particles have a spinel, perovskite, or perovskite-like structure comprising:

$$A_xA'_{1-x}B_yB'_{2-y}D_zO_q$$

wherein:
- A and A' are each independently selected from lanthanum, yttrium, samarium, europium, gadolinium, dysprosium, holmium or mixtures thereof;
- B and B' are each independently selected from barium, strontium-calcium, barium-strontium or barium-calcium;
- D is selected from platinum, copper, silver, tin or mixtures thereof;
- x is about 1;
- y is about 2;
- z is about 3; and
- q is 7−d, where d is between 0 and 0.7.

9. The process of claim 6 wherein in step (b) the pH is between about 4 and 5.

10. The process of claim 6 wherein step (a) the soluble salts are selected from organic and inorganic salts.

11. The method of claim 10 wherein in step (a) the soluble salts are selected from nitrates or acetates.

12. The process of claim 10 wherein the concentration of soluble salts is between about 0.015 and 0.15 molal.

13. The process of claim 12 wherein A and A' are each yttrium.

14. The process of claim 13 wherein D is copper.

15. The process of claim 14 wherein B and B' are each barium.

16. A process to produce a high $T_c$ electrically superconducting article, which method comprises:
  (A) for the superconducting article combining
    (i) at least one unsaturated organic acid metal salt of at Group IIA element,
    (ii) at least one unsaturated organic acid metal salt of bismuth or a Group IIIA, IIIB, IVA, or VA element; and
    (iii) at least one unsaturated organic acid metal salt selected from Group IB, IIB, VIII or IVB elements; to produce an aqueous solution wherein the ratio of metal atoms in (i), (ii) (iii) is selected to produce a high $T_c$ electrically superconducting article upon its subsequent high temperature pyrolysis in a flowing oxygen or air atmosphere;
  (B) removing water present to produce a powder;
  (C) contacting the solid powder with sufficient nitrate-producing reagent at a temperature of between about 100°–150° C. under anhydrous conditions to replace any carbon containing group with nitrate and removing the volatile carbon containing group producing a mixture of nitrate salts;
  (D) calcining the solid residue of step (E) in sufficient flowing oxygen or air at a temperature of between 700° and 1200° C. for a time effective to produce the corresponding oxides; and
  (E) slowly cooling the solid obtained at a temperature of between about 1200° C. and 550° C. at a rate of between about and 10° C. per minute in excess air or oxygen;
  (F) subsequently slowly annealing the mixed metal oxide obtained in flowing oxygen or air at about 500° C. to ambient temperature; and
  (G) cooling the oxide to a rate of between about 1 and 10° C. per minute in flowing air or oxygen with the proviso that when a superconducting oxide is prepared the maximum temperature in steps (D) and (E) is about 950° C.

17. The process of claim 16 wherein
  the Group IIIA, IIIB, IVA, VA elements are such independently selected from bismuth, lanthanum, yttrium, praseodymium, lead, thallium, samarium, europium, gadolinium, dysprosium, holmium, terbium or mixtures thereof,
  the Group IIA elements are each independently selected from barium, strontium, calcium or mixtures thereof, and
  the Group IB, IIB, IVB or VIII elements are independently selected from platinum, copper, silver, tin or mixtures thereof.

18. The process of claim 17 wherein the maximum calcining and heating temperature is 950° C. and the superconducting oxide produced is $YBa_2Cu_3O_{7-d}$.

* * * * *